US007591041B1

United States Patent
Cheng

(10) Patent No.: US 7,591,041 B1
(45) Date of Patent: Sep. 22, 2009

(54) PNEUMATIC CLEANING MODULE FOR MAGNETIC RULER OF POSITION MEASUREMENT SYSTEM

(75) Inventor: Don-Hua Cheng, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 12/228,048

(22) Filed: Aug. 8, 2008

(51) Int. Cl.
*A47L 5/38* (2006.01)
(52) U.S. Cl. ............ 15/300.1; 15/312.1; 15/316.1; 15/318
(58) Field of Classification Search ............ 15/1.3, 15/300.1, 301, 303, 312.1, 316.1, 318; *A47L 5/38, A47L 15/00*
See application file for complete search history.

(56) References Cited

U.S. PATENT DOCUMENTS

| 4,912,856 | A | * | 4/1990 | Ernst | 33/702 |
| 5,947,658 | A | * | 9/1999 | Eysel | 408/147 |
| 6,498,653 | B1 | * | 12/2002 | Wang | 356/498 |
| 2006/0001390 | A1 | * | 1/2006 | Yamazaki et al. | 318/135 |

* cited by examiner

*Primary Examiner*—David A Redding
(74) *Attorney, Agent, or Firm*—Charles E. Baxley

(57) ABSTRACT

A pneumatic cleaning module for a magnetic ruler of a position measurement system is combined with a displacement transducer of the position measurement system by a screw so that when the displacement transducer moves along the magnetic ruler, the pneumatic cleaning module implements a high-pressure air to remove swarf, dirt and impurities from a surface of the magnetic ruler.

5 Claims, 6 Drawing Sheets

PNEUMATIC CLEANING MODULE FOR MAGNETIC RULER OF POSITION MEASUREMENT SYSTEM

BACKGROUND OF THE INVENTION

1. Technical Field

The present invention relates to pneumatic cleaning modules, and more particularly, to a pneumatic cleaning module for a magnetic ruler of a position measurement system.

2. Description of Related Art

FIGS. 1 and 2 depict basic structure of a position measurement system that comprises a magnetic ruler 50 affixed to a machine by an adhesive and a displacement transducer 60 designed to move along a surface of the magnetic ruler 50. While the position measurement system may be implemented for cutting works, it sometimes confronts oil or water during operation and the adhesive that attaches the magnetic ruler 50 to the machine tends to deteriorate or become totally invalid after long-term washout. Consequently, the magnetic ruler 50 may loosen from and come off the machine. To avoid this, the magnetic ruler 50 is preferably to be as isolated as possible from direct contact with the cutting oil or water. Or, the cutting oil or water spraying over the magnetic ruler 50 must be removed as soon as possible. Besides, as the magnetic ruler 50 in nature attracts ferroic substances, when a workpiece processed by the machine contains iron or other ferroic substances, some swarf of the workpiece may be caught by the magnetic ruler 50 and bring interference to the position measurement system in its measurement.

One known solution for preventing the said problems is to provide the displacement transducer 60 at its bottom with a scraper 61 that contacts the surface of the magnetic ruler 50 so that when the displacement transducer 60 moves, the scraper 61 serves to scrape off the cutting swarf and cutting oil from the surface of the magnetic ruler 50.

Such conventional cleaning module for a magnetic ruler of a position measurement system nevertheless has some drawbacks. That is, after lasting out friction with the magnetic ruler 50 for a certain period of time, the scraper 61 tends to suffer from inferior scraping effect caused by deterioration and deformation thereof. Eventually, the scraper 61 can become invalid to competently remove the swarf and cutting oil from the surface on the magnetic ruler 50. Or what is worse, the deteriorated scraper 61 can generate flakes or dust that may accumulate on the surface of the magnetic ruler 50 and adversely affect the accuracy of the position measurement system. Therefore, it is important to periodically replace the scraper 61 at the bottom of the displacement transducer 60.

While first recesses 601 are provided at a lower end of the displacement transducer 60, the scraper 61 has protrusions 611 at an upper end thereof for being engaged by the first recesses 601. However, since the displacement transducer 60 and the magnetic ruler 50 of the conventional device are settled closely with merely a narrow interval therebetween, replacement of the scraper 61 is unmanageable.

SUMMARY OF THE INVENTION

One objective of the present invention is to provide a pneumatic cleaning module for a magnetic ruler of a position measurement system wherein the pneumatic cleaning module implements a high-pressure aerojet means to remove swarf, dust and impurities from a surface of the magnetic ruler.

Another objective of the present invention is to provide a pneumatic cleaning module for a magnetic ruler of a position measurement system wherein the pneumatic cleaning module serves to maintain cleanness of a surface of the magnetic ruler.

To achieve the foregoing objectives, in a position measurement system, between a magnetic ruler and a displacement transducer that moves along the magnetic ruler, a pneumatic cleaning module is affixed to the displacement transducer and comprises:

at least one main air channel, formed inside the pneumatic cleaning module;

at least one air inlet, formed at a surface of the pneumatic cleaning module and communicated with the main air channel; and at least one branch channel, formed inside the pneumatic cleaning module and communicated with the main air channel, said branch channel having an opening formed at the surface of the pneumatic cleaning module and corresponding to a surface of the magnetic ruler, wherein when a high-pressure air is input from the air inlet, the high-pressure air passes through the main air channel and the branch channel to reach the surface of the magnetic ruler through the opening of the branch channel, so as to clean the surface of the magnetic ruler by an aerojet means.

In the present invention, the pneumatic cleaning module is combined with the displacement transducer by a screw means. Thus, the pneumatic cleaning module is convenient to install and replace.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENTS

While a preferred embodiment is provided herein for illustrating the concept of the present invention as described above, it is to be understood that the components in these drawings are made for better explanation and need not to be made in scale. Moreover, in the following description, resemble components are indicated by the same numerals.

Figure 1:
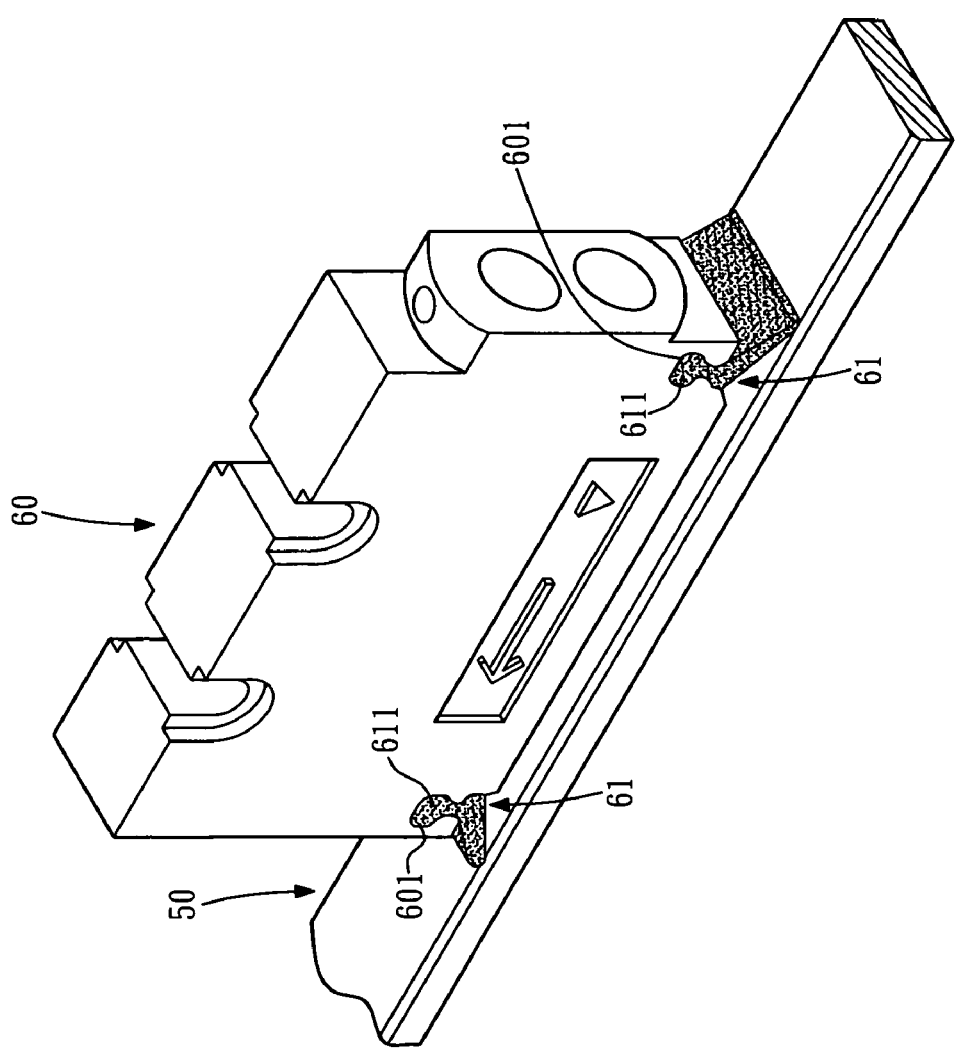
FIG. 1 is a perspective view of a conventional assembly of a displacement transducer, a scraper and a magnetic ruler.
Figure 2:
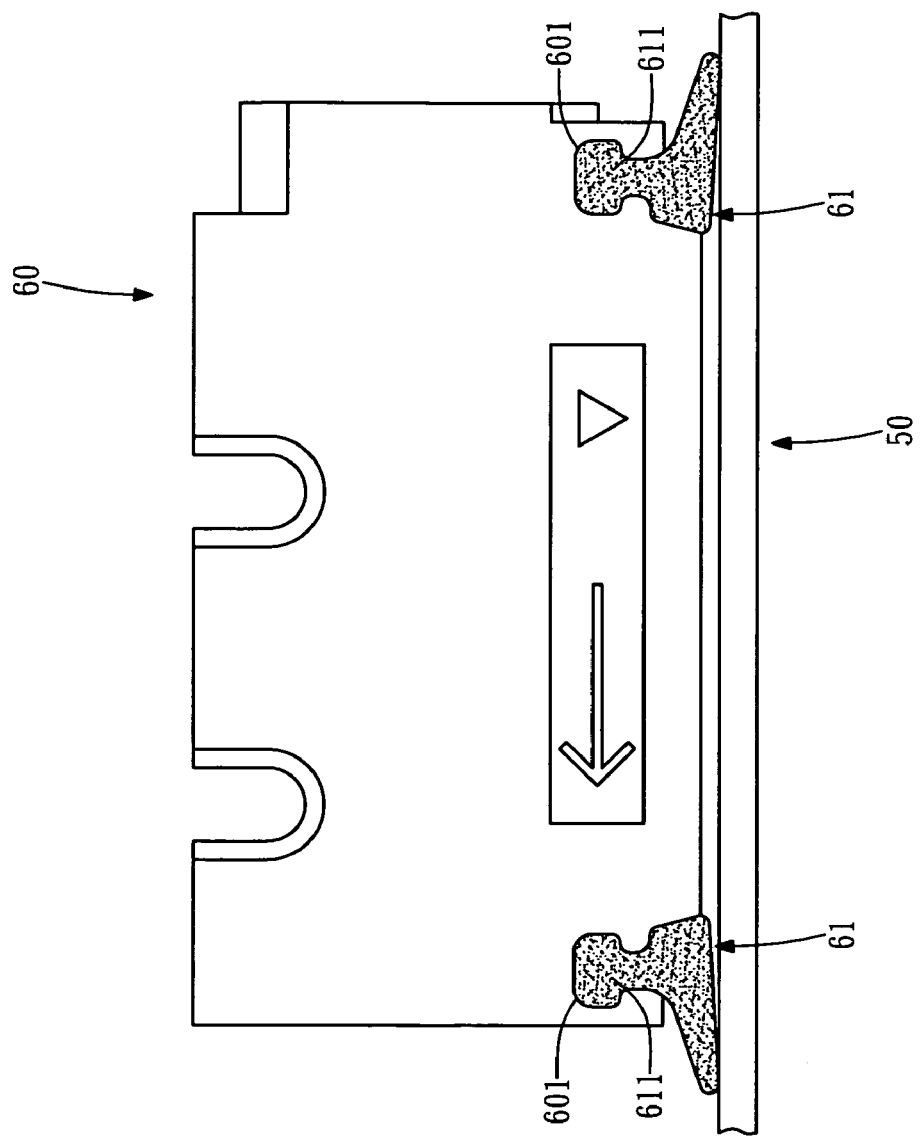
FIG. 2 is a lateral view of the conventional displacement transducer, scraper and magnetic ruler.
Figure 3:
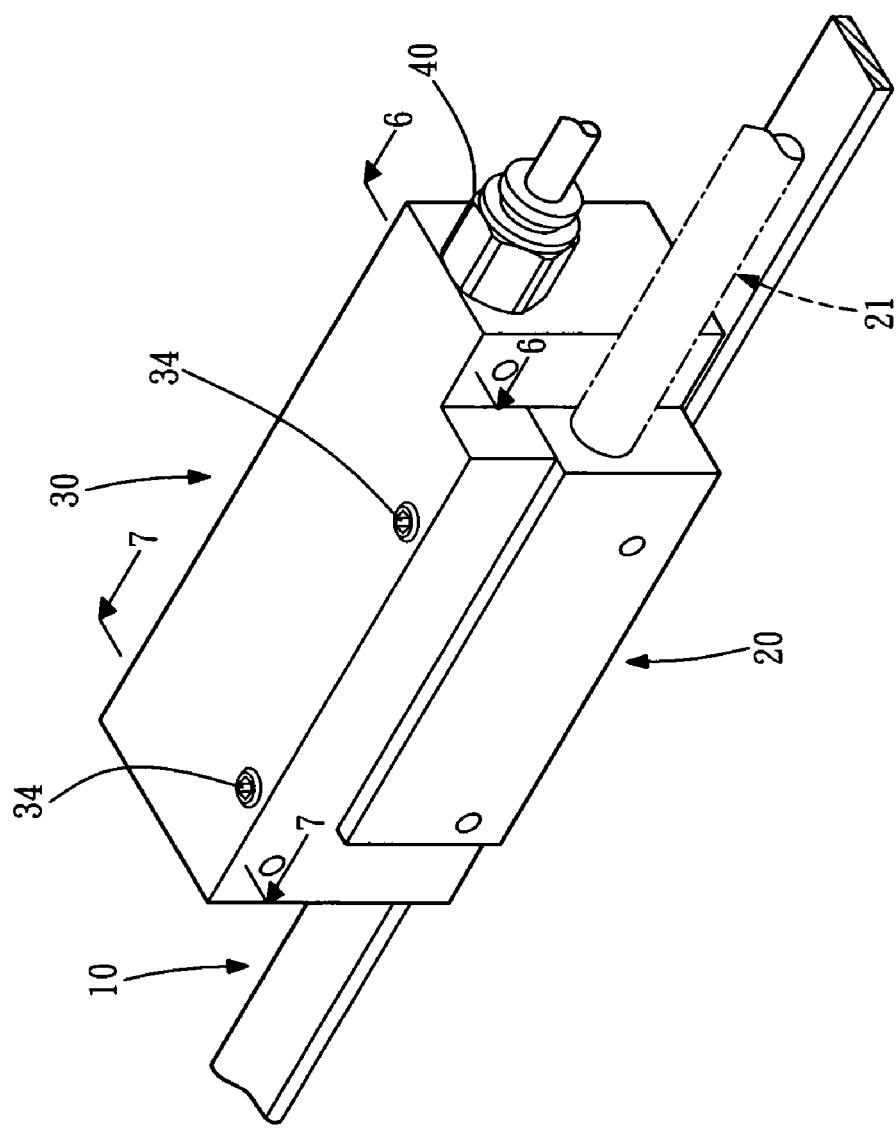
FIG. 3 is a perspective view of a pneumatic cleaning module of the invention applied to a position measurement system.

Please refer to FIG. 3 for a perspective view of a pneumatic cleaning module of the invention applied to a position measurement system. Therein, the position measurement system comprises a displacement transducer 20 and a magnetic ruler 10. The displacement transducer 20 is configured to move along the magnetic ruler 10 and data acquired by the displacement transducer 20 are transmitted to a related device through a transmission line 21. A pneumatic cleaning module 30 is combined with the displacement transducer 20 by at least one screw 34 so that the cleaning module 30 moves simultaneously with the displacement transducer 20 and is allowed to functionally correspond all over a surface of the magnetic ruler 10.

Figure 4:
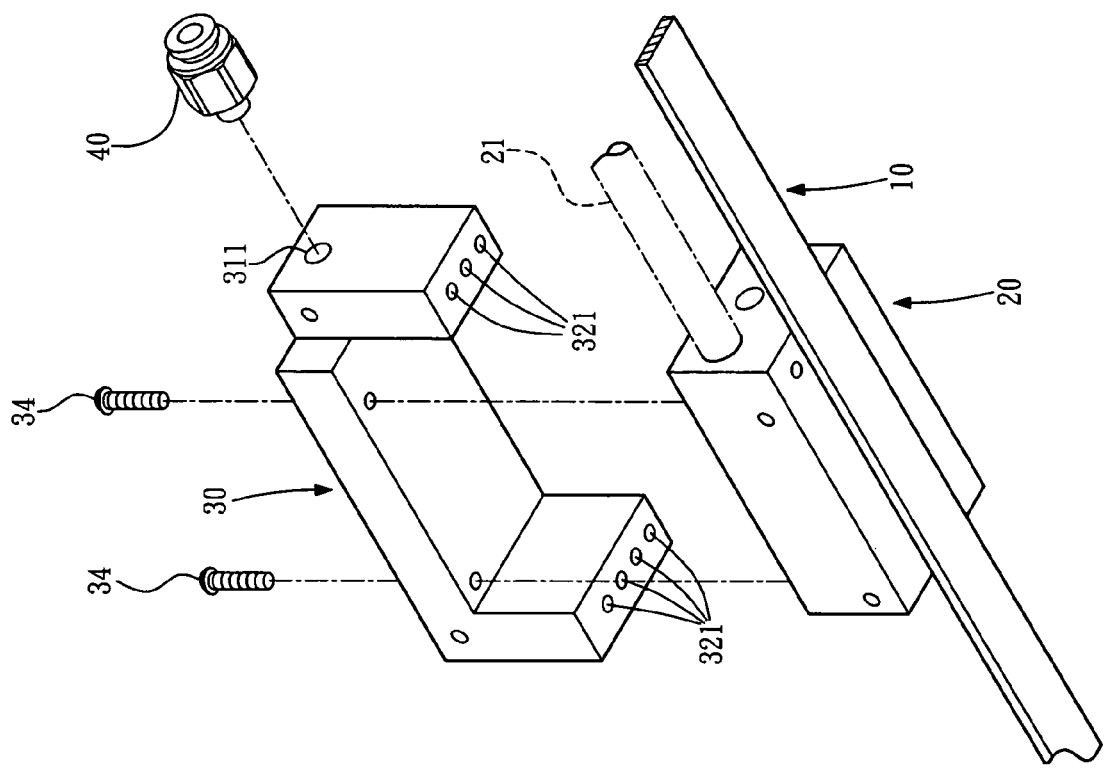
FIG. 4 is an exploded view of the pneumatic cleaning module of the present invention and the position measurement system.
Figure 5:
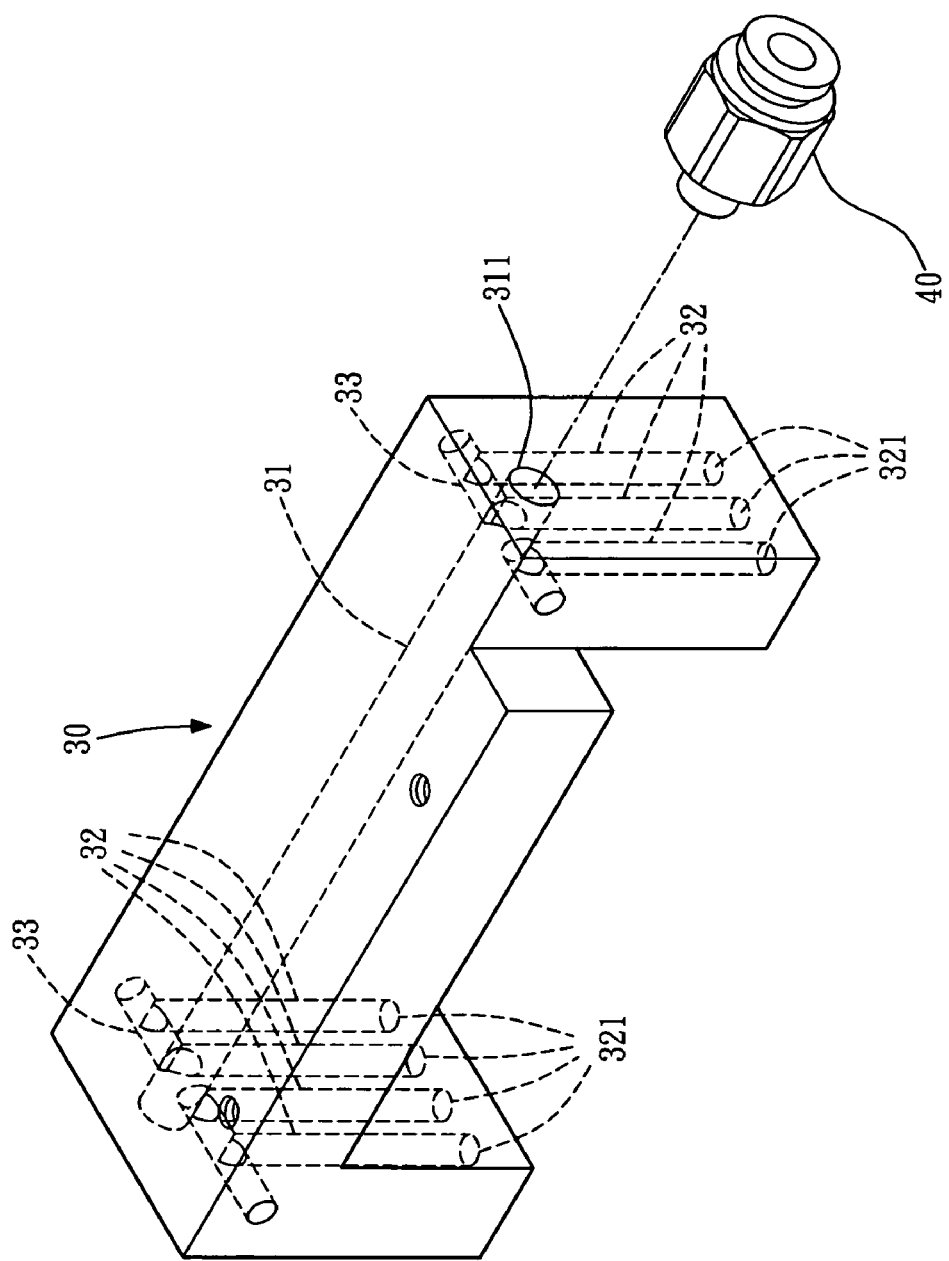
FIG. 5 is a schematic drawing showing inner structure of the pneumatic cleaning module of the present invention.

As can be seen in FIGS. 4 and 5, the cleaning module 30 comprises the following components.

A main air channel 31 is formed inside the pneumatic cleaning module 30.

An air inlet 311 is formed at a surface of the pneumatic cleaning module 30. The air inlet 311 is communicated with the main air channel 31 and attached by a high-pressure air connector 40 so that a high-pressure air source (not shown) can input a high-pressure air into the main air channel 31 through the high-pressure air connector 40.

Figure 6:
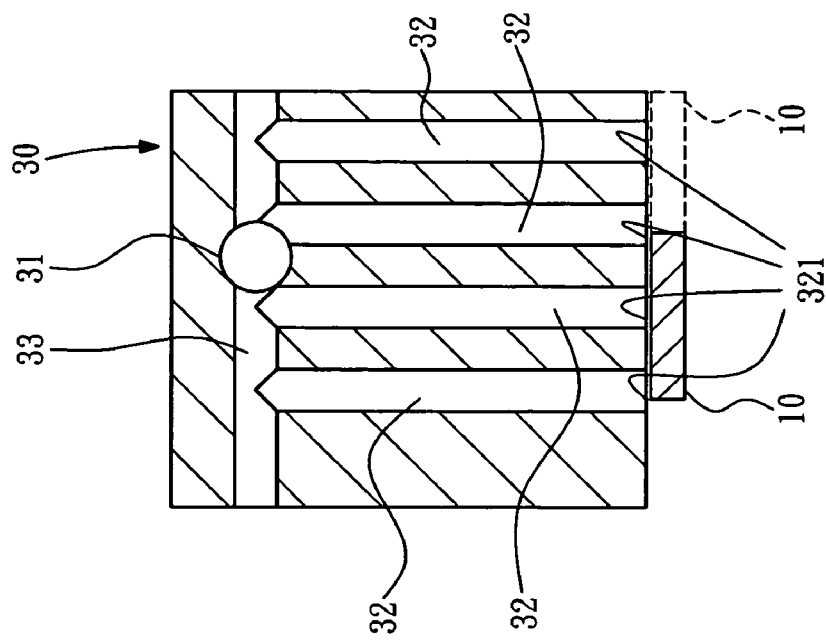
FIG. 6 is a cross-sectional drawing taken along line 6-6 of FIG. 3 and seeing along the adjacent arrow.
Figure 7:
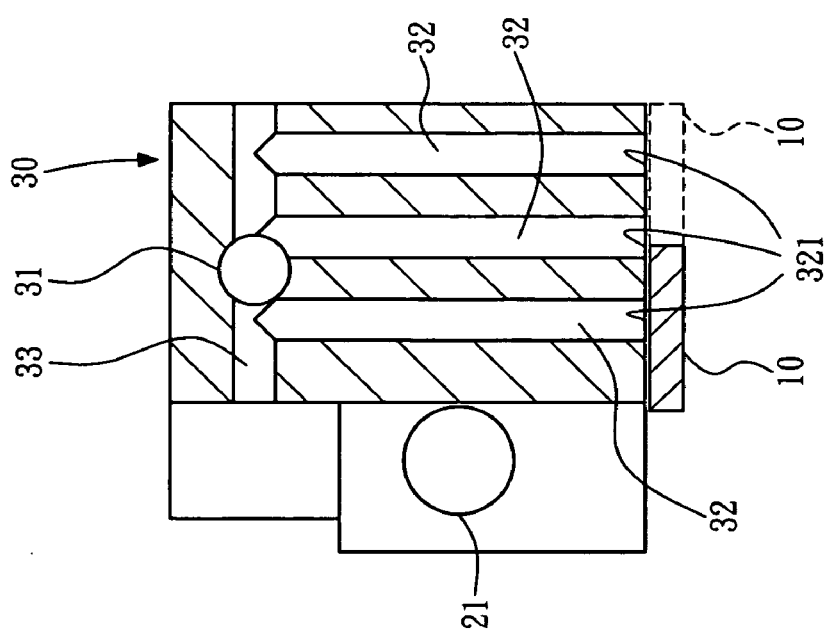
FIG. 7 is a cross-sectional drawing taken along line 7-7 of FIG. 3 and seeing along the adjacent arrow.

Seeing FIG. 6 with FIG. 7, a plurality of branch channels 32 are provided at two half courses of the pneumatic cleaning module 30. Each said branch channel 32 has a branch channel opening 321 corresponding to the surface of the magnetic ruler 10. The branch channels 32 at that same half course of the cleaning module 30 are communicated with the main air channel 31 by at least one connecting channel 33.

When the high-pressure air source inputs the high-pressure air into the main air channel 31 through the high-pressure air connector 40, the high-pressure air advances along the main air channel 31 and enters the connecting channels 33, thereby reaching the surface of the magnetic ruler 10 through the branch channel openings 321 in an aerojet manner so as to excellently remove cutting oil and impurities from the surface of the magnetic ruler 10. Thereby, the disclosed subject facilitates improving the cleanness of the surface of the magnetic ruler 10.

As shown in FIGS. 6 and 7, in virtue of the plural branch channels 32, the pneumatic cleaning module 30 is adaptive to the magnetic ruler 10 of all dimensions. In the drawings, the magnetic ruler 10 is extended to the exemplificative extent enclosed by dotted lines.

Although the particular embodiment of the invention has been described in detail for purposes of illustration, it will be understood by one of ordinary skill in the art that numerous variations will be possible to the disclosed embodiment without going outside the scope of the invention as disclosed in the claims.

What is claimed is:

1. A pneumatic cleaning module for a magnetic ruler of a position measurement system, wherein the position measurement system comprises the magnetic ruler and a displacement transducer that moves along the magnetic ruler, and the pneumatic cleaning module is combined with the displacement transducer, said pneumatic cleaning module comprising:
    at least one main air channel, formed inside the air cleaning module;
    at least one air inlet, formed at a surface of the air cleaning module and communicated with the main air channel; and
    at least one branch channel, formed inside the air cleaning module and communicated with the main air channel, said branch channel having an opening formed at the surface of the air cleaning module and positionally corresponding to a surface of the magnetic ruler;
    whereby when a high-pressure air is input from the air inlet, the high-pressure air passes through the main air channel and the branch channel to reach the surface of the magnetic ruler through the opening of the branch channel.

2. The pneumatic cleaning module as claimed in claim 1, wherein the at least one branch channel comprises two said branch channels provided at two half courses of the pneumatic cleaning module, respectively, in which each said branch channel has an opening corresponding to the surface of the magnetic ruler.

3. The pneumatic cleaning module as claimed in claim 1, wherein the at least one branch channel comprises at least two said branch channels provided at each of two half courses of the pneumatic cleaning module, in which the branch channels at the same half course are communicated with the main air channel through a connecting channel.

4. The pneumatic cleaning module as claimed in claim 1, wherein the pneumatic cleaning module and the displacement transducer are combined by at least one screw.

5. The pneumatic cleaning module as claimed in claim 1, wherein the air inlet is attached by a high-pressure air connector.

* * * * *